United States Patent [19]
Francis et al.

[11] Patent Number: 5,498,144
[45] Date of Patent: Mar. 12, 1996

[54] COTTON CANDY MACHINE AND SUGAR CONTROLLER

[75] Inventors: Kurt M. Francis, Cincinnati, Ohio; Leroy Hubbard, Independence, Ky.

[73] Assignee: Gold Medal Products Co., Cincinnati, Ohio

[21] Appl. No.: 224,266

[22] Filed: Apr. 7, 1994

[51] Int. Cl.⁶ ........................................... B28B 1/54
[52] U.S. Cl. .................... 425/9; 425/8; 425/196
[58] Field of Search .................. 425/9, 8, 196; 264/8

[56] References Cited

U.S. PATENT DOCUMENTS

| | | | |
|---|---|---|---|
| 1,210,097 | 12/1916 | Perry et al. | 425/8 |
| 1,489,342 | 4/1924 | Brent | 425/9 |
| 2,005,987 | 6/1935 | Bowen | 425/8 |
| 2,368,049 | 1/1945 | Stratford | 425/8 |
| 2,439,776 | 4/1948 | Klein et al. | 425/8 |
| 2,467,470 | 4/1949 | Gerhold et al. | 425/8 |
| 3,036,532 | 5/1962 | Bowe | 425/9 |
| 3,070,045 | 12/1962 | Bowe | 425/9 |
| 3,073,262 | 1/1963 | Bowe | 425/9 |
| 3,118,396 | 1/1964 | Brown et al. | 425/9 |
| 3,118,397 | 1/1964 | Brown et al. | 425/9 |
| 4,731,001 | 3/1988 | Yamamoto et al. | 425/9 |
| 4,793,782 | 12/1988 | Sullivan | 425/9 |
| 4,842,502 | 6/1989 | Tsumita et al. | 425/9 |
| 4,872,821 | 10/1989 | Weiss | 425/9 |
| 5,002,787 | 3/1991 | Fraile et al. | 426/467 |

OTHER PUBLICATIONS

Webster's Seventh New Collegiate Dictionary. G & C Merriam Company. (no month), 1963, pp. 345, 1005.

*Primary Examiner*—Jay H. Woo
*Assistant Examiner*—Vi Duong Dang
*Attorney, Agent, or Firm*—Wood, Herron & Evans

[57] ABSTRACT

In a cotton candy machine for spinning granular sugar into filaments and having a rotatable shaft, a spinner head mounted on the shaft for rotation therewith, bearings rotatably supporting the rotatable shaft below the spinner head, an impeller mounted on the shaft for rotation therewith and being disposed between the spinner head and the bearings. The impeller rotates to blow sugar which finds its way down to the level of the impeller away from the bearings. The impeller has a plurality of radially extending fins or vanes on at least one of the upper and lower side, and an O-ring groove in its lower side in which an O-ring is seated which seals against the motor. Radially directed air flow generated by rotation of the impeller with the rotating shaft directs sugar granules away from the bearings, and the O-ring seals the impeller against the motor to provide an additional check against sugar entering the bearings. Sugar is unable to reach the bearings of the motor and motor life is increased.

26 Claims, 2 Drawing Sheets

COTTON CANDY MACHINE AND SUGAR CONTROLLER

FIELD OF THE INVENTION

This invention relates generally to cotton candy machines, and more particularly to an improvement in cotton candy machines for lengthening the life of bearings within the machine which support the rotating shaft to which is mounted the spinner head.

BACKGROUND OF THE INVENTION

Machines for spinning granular sugar into sugar filaments or so-called cotton candy are known and have been employed for some time to produce cotton candy. A typical cotton candy machine has a base which houses a motor which drives a rotatable shaft to which a spinner head is mounted. Bearings rotatably support the rotating shaft within the motor. Granular sugar is introduced into the spinner head which includes heating elements and the like for melting the granular sugar. The rotation of the spinner head causes the melted granular sugar to be spun or slung out of holes or slots in the spinner head and onto the inner surface of a bowl or basket mounted to the base of the cotton candy machine. The sugar filaments adhered to the basket may then be transferred to a paper tube or the like by rolling one end of the tube about the circumference of the basket to collect the cotton candy on the tube end.

A problem associated with cotton candy machines and one which limits the life of the motors and hence the machines is that sugar finds its way down into the bearings supporting the rotating shaft. As is appreciated, the introduction of sugar into these bearings results in premature bearing failure requiring that the cotton candy machine motor be replaced.

More particularly, when the machine is disassembled for routine maintenance, and particularly when the spinner head is removed, sugar works its way downwardly into the motor and into the motor shaft bearings. Further, sugar blown into the bowl or basket tends to find its way into the motor bearings as well. Still further, cotton candy tends to wrap around the spinner head and is pulled downwardly into the motor and hence bearings. Prior efforts directed towards blocking sugar from the motor bearings have not met with great success, and bearing failure is a continuing durability problem.

SUMMARY OF THE INVENTION

It has therefore been an objective of the present invention to extend the life of a cotton candy machine motor by improved apparatus for preventing sugar from working its way downwardly from the spinner head into the bearings which support the rotating motor shaft.

Another objective of the present invention has been to provide improved apparatus for extending useful motor life in a cotton candy machine.

To these ends, in a cotton candy machine having a rotatable shaft, a spinner head mounted on the shaft for rotation therewith for melting granular sugar introduced thereinto, and bearings rotatably supporting the rotatable shaft below the spinner head, an impeller is mounted on the shaft for rotation therewith and disposed between the spinner head and the bearings. The rotating impeller is operable to direct sugar, which finds its way downwardly from the spinner head to the impeller, away from the bearings thereby preventing that sugar from entering the bearings and causing premature bearing failure.

The impeller comprises a circular disk having a bore adapted to receive therethrough the rotatable shaft, and a plurality of circumferentially spaced radially extending fins or vanes on at least one of the upper side or lower side of the disk. The impeller has an axially extending circumferential flange or skirt projecting upwardly from the upper side of the disk which is adapted to fit over the lower end of the spinner head. The fins are circumferentially spaced about the longitudinal axis of the disk at 45° increments. In one embodiment of the impeller, the impeller disk includes circumferentially spaced radially extending fins on both upper and lower sides thereof. In the preferred form of the impeller, however, the disk has arcuately shaped radially extending fins on only the lower side.

A further feature of the invention is a circumferential O-ring groove in the lower side of the impeller disk, with an O-ring being disposed in the O-ring groove. The O-ring is operable to seal against the motor housing which houses the motor that imparts rotation to the rotatable shaft thereby providing an extra measure of security in preventing sugar from reaching the motor bearings.

A major advantage of the present invention is that the life of cotton candy machine motors is substantially increased since the impeller prevents sugar from working its way down into the motor bearings and causing premature bearing failure.

These and other objects and advantages of the present invention will become more readily apparent during the following detailed description taken into conjunction with the drawings herein, in which:

DETAILED DESCRIPTION OF THE INVENTION

Figure 1:
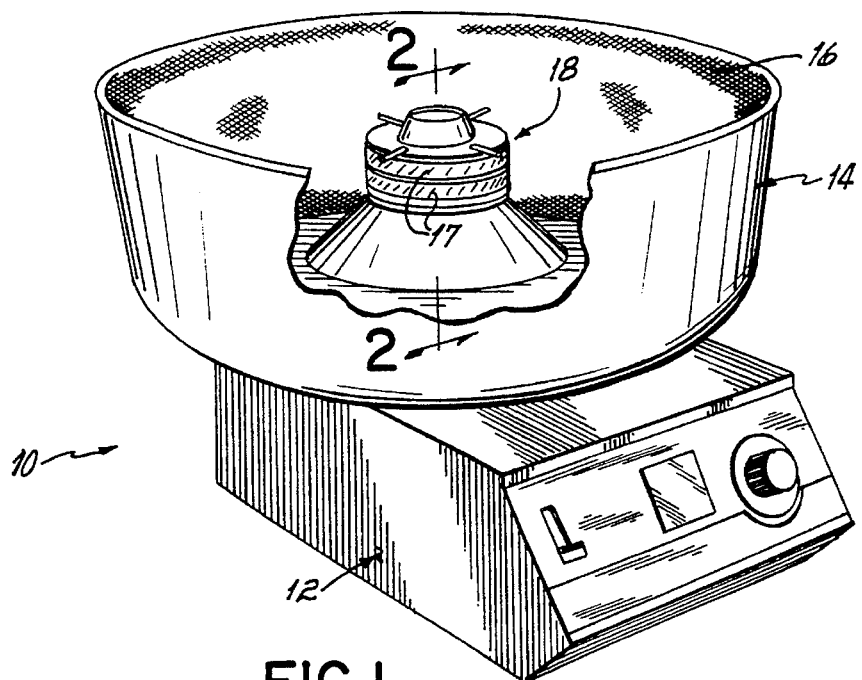
FIG. 1 is a perspective view of a cotton candy machine constructed in accordance with the principles of the present invention.
Figure 2:
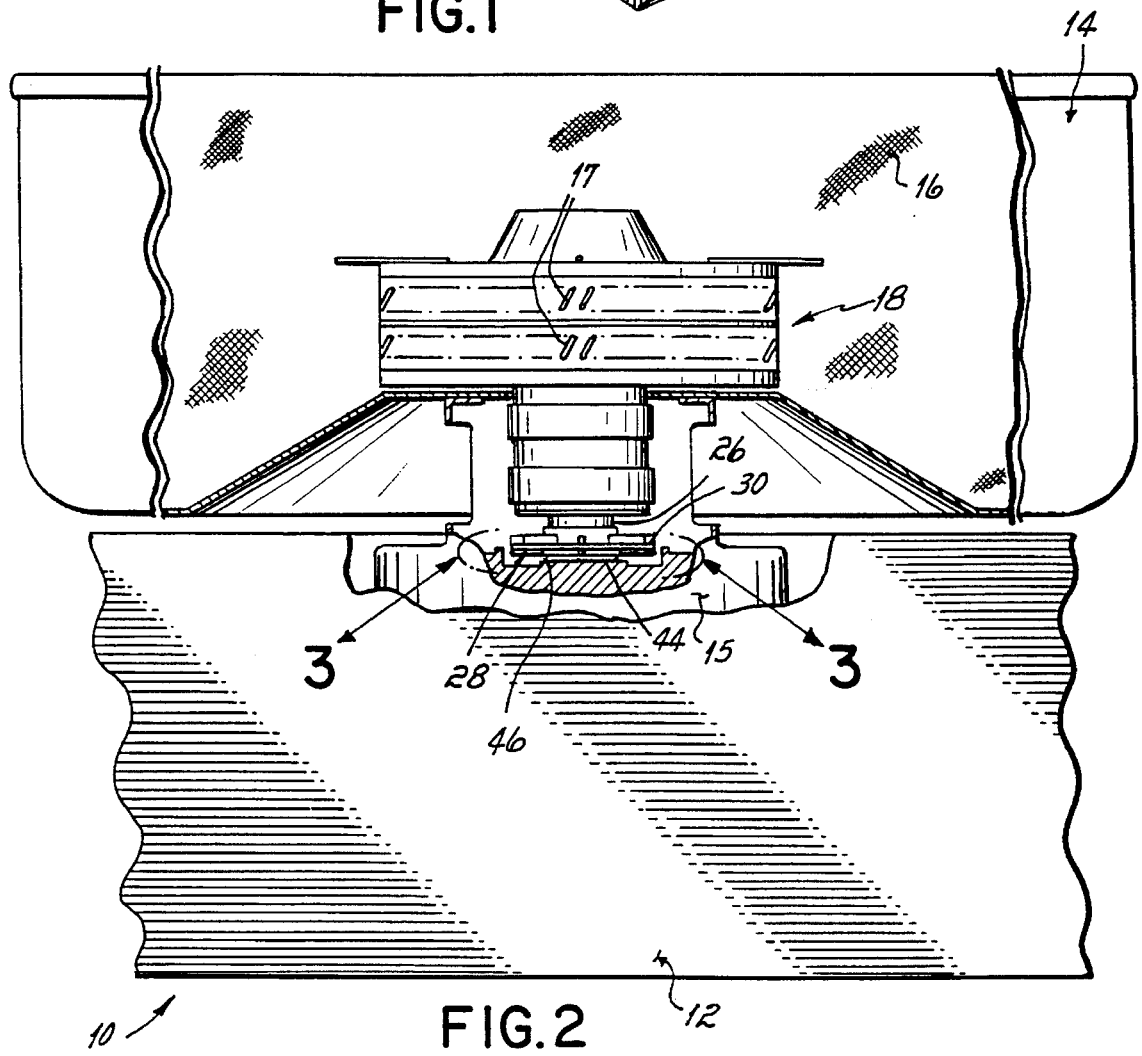
FIG. 2 is a partly broken away elevational view of the cotton candy machine of FIG. 1.
Figure 3:
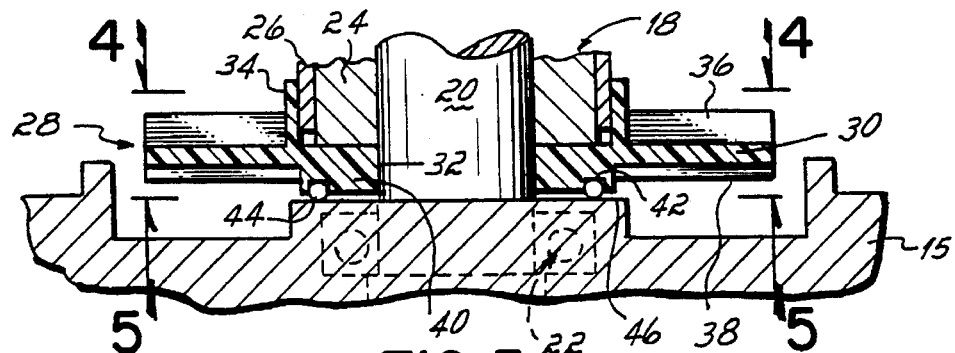
FIG. 3 is an enlarged view of the encircled area 3—3 of FIG. 2 showing one embodiment of the invention.

With reference first to FIG. 1 there is shown a cotton candy machine 10 of one type with which the invention may be used. The machine 10 includes a base 12 on which a basket or bowl 14 is mounted. The basket 14 includes a mesh insert 16 for catching cotton candy (not shown) as the cotton candy is formed. Referring to FIGS. 1–3, a motor shown diagrammatically at 15 supports a rotatable spinner head 18. Spinner head 18 includes a heating element or the like (not shown) to melt granular sugar which is introduced thereinto. In operation rotating spinner head 18 causes melted sugar to be thrown out of or otherwise ejected from slots 17. The sugar filaments collect on the mesh insert 16. The details of spinner head 18 are known generally to those skilled in the art and are not shown in the drawings nor described in great detail herein. The lower end of spinner head 18 is mounted to a rotatable shaft 20. That shaft 20 is supported by bearings shown diagrammatically at 22 within motor 15. The spinner head 18 includes an upright base or skirt portion 24 surrounded by a cylindrical sleeve insulator 26. Further details of a typical construction of spinner head 18 can be seen in Weiss U.S. Pat. No. 4,872,821, assigned to the assignee of the present invention, the disclosure of which is hereby incorporated by reference herein as if fully set forth in its entirety.

Figure 4:
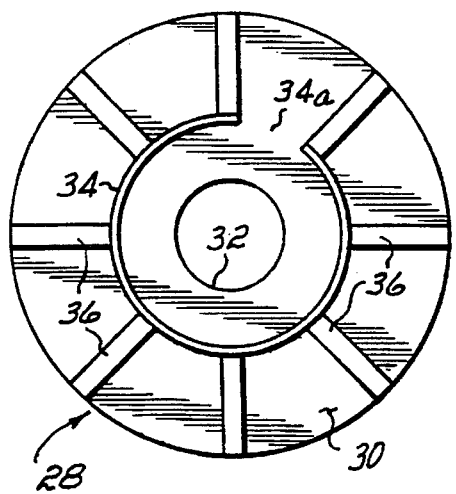
FIG. 4 is a view taken along line 4—4 of FIG. 3.
Figure 5:
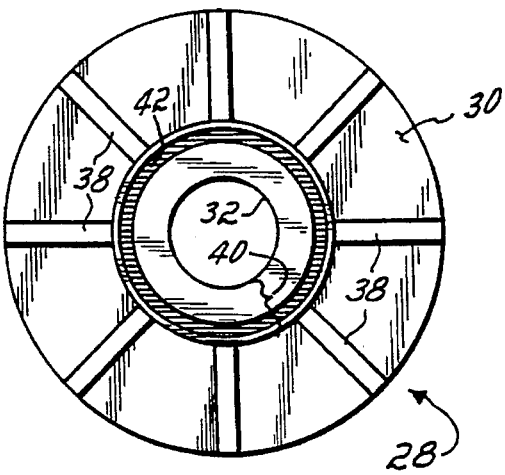
FIG. 5 is a view taken along line 5—5 of FIG. 3.

Referring now to FIGS. 3–5, on the lower end of the shaft 20 there is mounted an impeller 28. According to this first embodiment impeller of FIGS. 2–5, impeller 28 includes a circular disk portion 30 which includes a bore 32 sized so as to be press fitted onto shaft 20. On the upper side of impeller 20 there is an upstanding circumferential circular collar 34 which engages and slides into position over the cylindrical sleeve insulator 26. Impeller 28 further includes a plurality of upstanding fins or vanes 36 mounted on the upper side of the disk 30. Impeller 28 further includes a plurality of fins or vanes 38 mounted on the lower side thereof. Fins or vanes 36 and 38 are circumferentially spaced about a longitudinal axis of the impeller 28 preferably at 45° increments or at any other suitable orientation. Opening 34a between adjacent ones of fins 36 facilitates access to a set screw (not shown) which retains spinner head 18 to shaft 20. In the preferred form of this embodiment of the present invention, disk 30 is about 2.5" in diameter and about 0.075" thick, the fins 36 on the upper side of the disk 30 are about 0.125" high, the fins 38 on the lower side of the disk 30 are about 0.05" high, and all of the fins 36 and 38 are approximately 0.125" wide.

Disk 30 further includes a lower shoulder or boss 40 which includes a circular, circumferential O-ring groove 42 therein. An O-ring 44 is disposed in the groove 42. O-ring 44 effects a seal between the impeller 28 and the shoulder 46 of the motor 15. In the preferred form, impeller 28 is fabricated of lexan.

Figure 6:
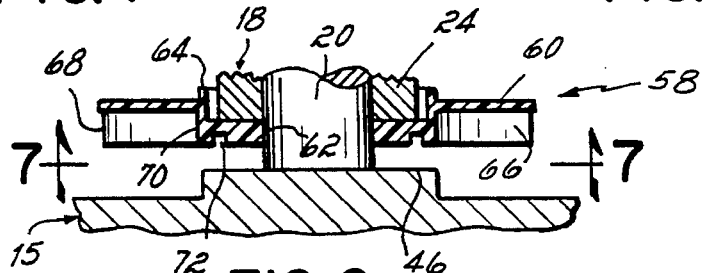
FIG. 6 is a view similar to FIG. 3 illustrating a preferred embodiment of the invention.
Figure 7:
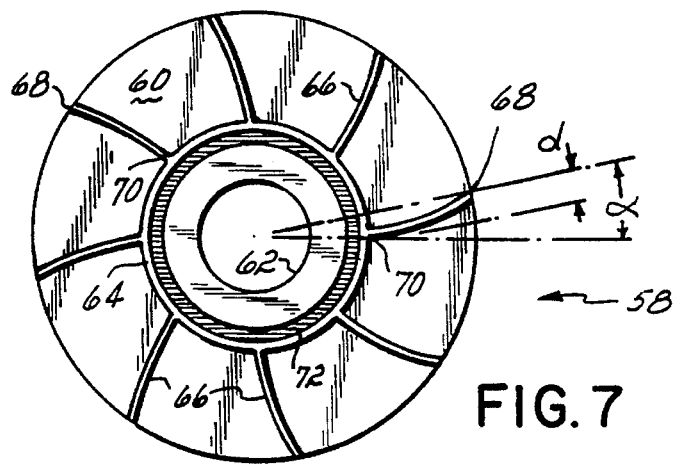
FIG. 7 is a view taken along line 7—7 of FIG. 6.

Referring now to FIGS. 6 and 7, a preferred embodiment of the impeller of the present invention is illustrated. Such impeller 58 is usefully disposed, for example, in the similar disposition of impeller 28 (FIGS. 2–3). In this preferred embodiment of impeller 58, includes a circular disk portion 60 which includes a bore 62 sized so as to be press fitted onto shaft 20. On the upper side of impeller 58 there is an upstanding circumferential circular collar 64 which surrounds the skirt portion 24 of the spinner head 18, but which does not engage the cylindrical sleeve insulator 26 as does collar 34 in the prior embodiment. Impeller 58 further includes a plurality of fins or vanes 38 mounted on the lower side thereof. As in the prior embodiment, the eight fins or vanes 38 preferably are equally spaced about the circumference of the impeller 58.

Fins 66 are preferably arcuately shaped as illustrated. Each fin has a radially outermost leading edge 68 and a radially inwardmost trailing edge 70. Edges 68 and 70 are spaced apart by approximately 0.217 in. as denoted by d, and by about 10° from the longitudinal axis of the impeller 58 as denoted by α. Disk 60 further includes a circular, circumferential O-ring groove 72 therein. An O-ring may be disposed in the groove 72 to effect a seal between the impeller 58 and the shoulder 46 of motor 15, though in the construction illustrated in FIG. 6, impeller 58 is mounted upwardly on shaft 20 and consequently any O-ring disposed in groove 72 would not contact the motor 15. As in the prior embodiment, the preferred material for impeller 58 is lexan.

In use, the impeller spins with the shaft 20 and spinner head 18. The radially directed air flow generated by impeller 28 or 58, which rotates at the same speed as shaft 20 (approximately 3400 rpm), creates a radially directed turbulence. This slings or throws any sugar reaching the impeller radially away from shaft 20 and hence bearings 22. Thus, downwardly falling sugar is unable to reach bearings 22.

As a further check on sugar entering bearings 22, O-ring 44 sealing against shoulder or boss 46 adds additional integrity to bearings 22 thus providing additional security against sugar entering bearings 22. However, it will be readily appreciated that the invention is not to be limited as requiring the O-ring 44 as the impeller could be employed without its use, or the significant telescoped overlap between the head 18 and impeller 28. For example, the mounting described herein is also useful to inhibit the migration of sugar into the bearings of a cotton candy machine and to lengthen motor life thereof when the spinner head 18 is mounted higher on the shaft 20 and is spaced further from the impeller 28. The invention is also useful when the impeller is mounted in a position spaced from the motor end bell or bearing housing 46 so no seal is effected by the O-ring 44 (as, for example, shown in FIG. 6). Further, the invention could be carried out also without the fins 38 on the lower side of the disk 30, as fins 38 serve as an additional means of generating radially outwardly directed air flow over and above that generated by fins 36 on the upper side of disk 30.

Those skilled in the art will readily recognize numerous adaptations and modifications which may be made to the cotton candy machine of the present invention and which will result in an improved cotton candy machine, yet all of which will fall within the spirit and scope of the present invention as defined in the following claims. Accordingly, the invention is to be limited only by the scope of the following claims and their equivalents.

What is claimed is:

1. A machine for spinning granular sugar into filaments comprising:

a rotatable shaft;

a spinner head mounted on said shaft for rotation therewith and for melting granular sugar introduced thereinto, said spinner head when rotating being operable to direct molten sugar filaments radially outwardly therefrom;

bearings rotatably supporting said rotatable shaft below said spinner head; and an impeller mounted on said shaft for rotation therewith and being disposed between said spinner head and said bearings, said impeller when rotating urging nonmolten sugar granules which have escaped from said spinner head radially away from said bearings at said impeller.

2. The machine of claim 1 wherein said impeller comprises:

a circular disk having upper and lower sides and a bore adapted to receive therethrough said shaft; and a plurality of radially extending fins on at least one of said upper and lower sides of said disk.

3. The machine of claim 2 wherein said impeller further comprises an axially extending circumferential collar projecting from said upper side of said disk and adapted to fit over a lower end of said spinner head.

4. The machine of claim 2 wherein said fins are circumferentially spaced at 45° increments about a longitudinal axis of said disk.

5. The machine of claim 2 wherein said disk includes radially extending fins on both said upper side and said lower side thereof.

6. The machine of claim 5 wherein said disk is about 2.5 in. in diameter and about 0.075 in. thick, said fins on said upper side of said disk are about 0.125 in. high, said fins on said lower side of said disk are about 0.05 in. high, and all said fins are about 0.125 in. wide.

7. The machine of claim 2 wherein said disk includes radially extending fins on said lower side thereof.

8. The machine of claim 7 wherein said radially extending fins are arcuately shaped.

9. The machine of claim 8 wherein each arcuately shaped radially extending fin has a radially outermost leading edge and a radially inwardmost trailing edge, said edges being spaced apart by about 0.217 in. and by about 10° as measured from said disk longitudinal axis.

10. The machine of claim 9 wherein said disk is about 2.5 in. in diameter and about 0.050 in. thick, and said fins are about 0.175 in. high and about 0.050 in. wide.

11. The machine of claim 2 wherein said disk further includes a circumferential O-ring groove in a lower side thereof, and an O-ring disposed in said O-ring groove, and wherein said machine further includes a motor disposed in a motor housing for imparting rotation to said rotatable shaft, said O-ring being operable to seal against said motor housing.

12. A machine for spinning granular sugar into filaments comprising:

a rotatable shaft;

a spinner head mounted on said shaft for rotation therewith and for melting granular sugar introduced thereinto, said spinner head when rotating being operable to direct molten sugar filaments radially outwardly therefrom;

bearings rotatably supporting said rotatable shaft below said spinner head; and an impeller mounted on said shaft for rotation therewith and being disposed between said spinner head and said bearings for generating a radially outward air flow at said impeller when rotating and directing nonmolten sugar granules which have escaped from said spinner head away from said bearings.

13. The machine of claim 12 wherein said impeller comprises:

a circular disk having upper and lower sides and a bore adapted to receive therethrough said shaft; and a plurality of radially extending fins on at least one of said upper and lower sides of said disk.

14. The machine of claim 13 wherein said impeller further comprises an axially extending circumferential collar projecting from said upper side of said disk and adapted to fit over a lower end of said spinner head.

15. The machine of claim 13 wherein said fins are circumferentially spaced at 45° increments about a longitudinal axis of said disk.

16. The machine of claim 13 wherein said disk includes radially extending fins on both said upper side and said lower side thereof.

17. The machine of claim 16 wherein said disk is about 2.5 in. in diameter and about 0.075 in. thick, said fins on said upper side of said disk are about 0.125 in. high, said fins on said lower side of said disk are about 0.05 in. high, and all said fins are about 0.125 in. wide.

18. The machine of claim 13 wherein said disk includes radially extending fins on said lower side thereof.

19. The machine of claim 18 wherein said radially extending fins are arcuately shaped.

20. The machine of claim 19 wherein each arcuately shaped radially extending fin has a radially outermost leading edge and a radially inwardmost trailing edge, said edges being spaced apart by about 0.217 in. and by about 10° as measured from said disk longitudinal axis.

21. The machine of claim 20 wherein said disk is about 2.5 in. in diameter and about 0.050 in. thick, and said fins are about 0.175 in. high and about 0.050 in. wide.

22. The machine of claim 13 wherein said disk further includes a circumferential O-ring groove in a lower side thereof, and an O-ring disposed in said O-ring groove, and wherein said machine further includes a motor disposed in a motor housing for imparting rotation to said rotatable shaft, said O-ring being operable to seal against said motor housing.

23. A machine for spinning granular sugar into filaments comprising:

a rotatable shaft;

a spinner head mounted on said shaft for rotation therewith and for melting granular sugar introduced thereinto, said spinner head when rotating being operable to direct molten sugar filaments radially outwardly therefrom;

a motor for imparting rotation to said rotatable shaft below said spinner head;

an impeller mounted on said shaft for rotation therewith and being disposed between said spinner head and said motor, said impeller being operable to direct nonmolten sugar granules which have escaped from said spinner head radially away from said shaft at said impeller when rotating; and a seal mounted on said impeller for effecting a seal between said impeller and said motor.

24. The machine of claim 23 wherein said impeller comprises a circular disk having an upper side and a lower side and adapted to be mounted to said shaft, said disk having a plurality of circumferentially spaced radially extending fins on at least one of said upper and lower side of said disk.

25. The machine of claim 24 wherein said seal comprises an O-ring groove in a lower surface of said disk and an O-ring disposed in said O-ring groove, said O-ring being operable to seal against said motor.

26. A machine for spinning granular sugar into filaments comprising:

a rotatable shaft;

a spinner head mounted on said shaft for rotation therewith and for melting granular sugar introduced thereinto, said spinner head when rotating being operable to direct molten sugar filaments radially outwardly therefrom;

a motor for imparting rotation to said rotatable shaft below said spinner head;

an impeller mounted on said shaft for rotation therewith and being disposed between said spinner head and said motor, said impeller being operable to direct nonmolten sugar granules which have escaped from said spinner head away from said shaft at said impeller when rotating; and a seal mounted on said impeller engaging respective surfaces of said impeller and motor for effecting a seal between said impeller and motor to provide additional protection against nonmolten sugar granules from finding their way into said motor.

* * * * *